United States Patent
Kim et al.

(10) Patent No.: US 9,848,397 B2
(45) Date of Patent: Dec. 19, 2017

(54) SYNCHRONIZING SIGNAL RECEIVING METHOD AND USER EQUIPMENT, AND SYNCHRONIZING SIGNAL TRANSMITTING METHOD AND BASE STATION

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 14/440,042

(22) PCT Filed: Nov. 4, 2013

(86) PCT No.: PCT/KR2013/009895
§ 371 (c)(1),
(2) Date: Apr. 30, 2015

(87) PCT Pub. No.: WO2014/069953
PCT Pub. Date: May 8, 2014

(65) Prior Publication Data
US 2015/0289219 A1 Oct. 8, 2015

Related U.S. Application Data

(60) Provisional application No. 61/722,227, filed on Nov. 4, 2012.

(51) Int. Cl.
*H04W 56/00* (2009.01)
*H04L 5/00* (2006.01)
(Continued)

(52) U.S. Cl.
CPC ....... *H04W 56/0005* (2013.01); *H04L 5/0053* (2013.01); *H04L 27/26* (2013.01);
(Continued)

(58) Field of Classification Search
CPC ......... H04W 56/0015; H04W 56/0005; H04W 72/0446; H04W 88/02; H04L 5/0053; H04L 27/26; H04L 27/2666; H04L 27/2607
See application file for complete search history.

(56) References Cited

U.S. PATENT DOCUMENTS

2007/0121484 A1 5/2007 Kim et al.
2012/0120911 A1 5/2012 Miyoshi et al.
(Continued)

FOREIGN PATENT DOCUMENTS

EP 1089510 4/2001
KR 10-2007-0048436 5/2007
(Continued)

OTHER PUBLICATIONS

PCT International Application No. PCT/KR2013/009895, Written Opinion of the International Searching Authority dated Feb. 25, 2014, 27 pages.
(Continued)

*Primary Examiner* — Jae Y Lee
(74) *Attorney, Agent, or Firm* — Lee Hong Degerman Kang Waimey

(57) ABSTRACT

The present invention defines multiple synchronizing signal resource candidates from/in which a synchronizing signal can be transmitted or detected. The base station according to the present invention transmits a synchronizing signal from a synchronizing signal resource, which corresponds to at least the cell identifier of a cell which is associated with the synchronizing signal, the time synchronization of the cell,
(Continued)

the length of a cyclic prefix which is applied to the cell, or the type of the base station, among the multiple synchronizing signal resource candidates. The user equipment according to the present invention can obtain information on at least the cell identifier, the time synchronization with the cell, the length of the cyclic prefix, or the type of the base station, on the basis of the synchronizing signal resource in which the synchronizing signal has been detected.

12 Claims, 10 Drawing Sheets

(51) Int. Cl.
  *H04W 72/04* (2009.01)
  *H04L 27/26* (2006.01)
  *H04W 88/02* (2009.01)

(52) U.S. Cl.
  CPC ..... *H04L 27/2666* (2013.01); *H04W 56/0015* (2013.01); *H04W 72/0446* (2013.01); *H04L 27/2607* (2013.01); *H04W 88/02* (2013.01)

(56) References Cited

U.S. PATENT DOCUMENTS

| | | | |
|---|---|---|---|
| 2013/0176952 A1* | 7/2013 | Shin | H04L 5/001 370/329 |
| 2014/0349664 A1* | 11/2014 | Pedersen | H04L 5/001 455/450 |

FOREIGN PATENT DOCUMENTS

| | | |
|---|---|---|
| KR | 10-2011-0058892 | 6/2011 |
| KR | 10-2012-0001598 | 1/2012 |
| WO | 00/033496 | 6/2000 |

OTHER PUBLICATIONS

Korean Intellectual Property Office Application Serial No. 10-2015-7012518, Notice of Allowance dated Oct. 14, 2016, 2 pages.

* cited by examiner

FIG. 9
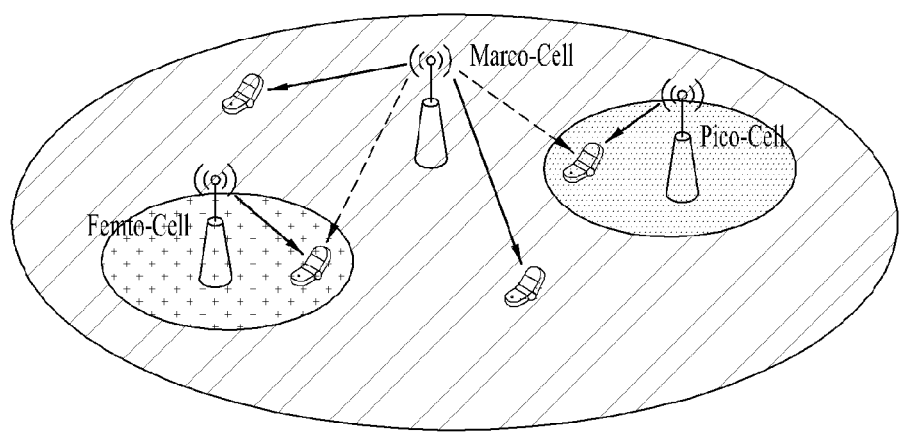
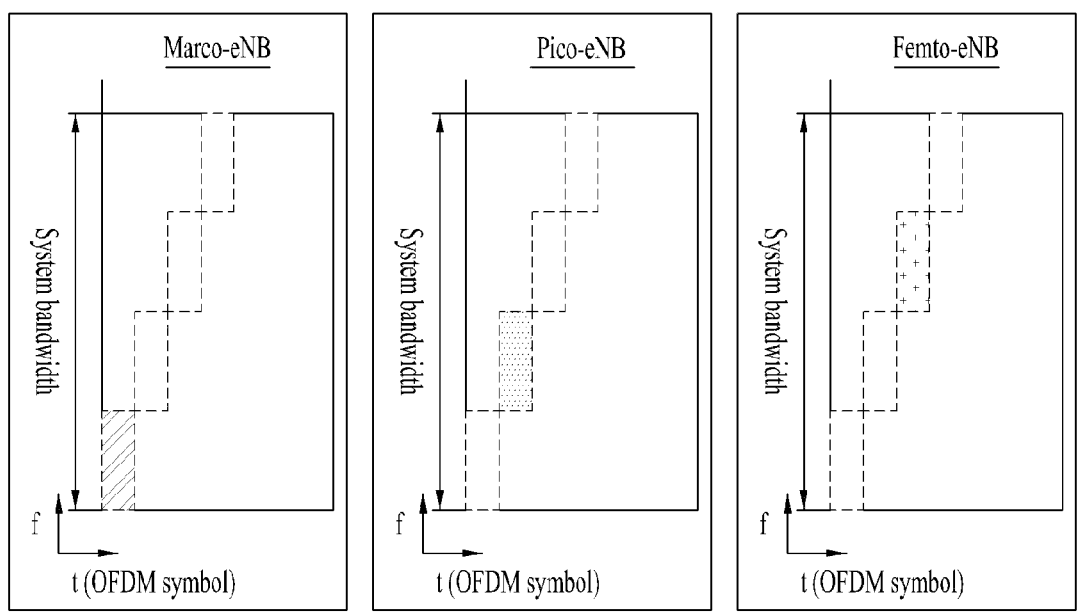

SYNCHRONIZING SIGNAL RECEIVING METHOD AND USER EQUIPMENT, AND SYNCHRONIZING SIGNAL TRANSMITTING METHOD AND BASE STATION

CROSS-REFERENCE TO RELATED APPLICATIONS

This application is the National Stage filing under 35 U.S.C. 371 of International Application No. PCT/KR2013/009895, filed on Nov. 4, 2013, which claims the benefit of U.S. Provisional Application No. 61/722,227, filed on Nov. 4, 2012, the contents of which are all hereby incorporated by reference herein in their entirety.

TECHNICAL FIELD

The present invention relates to a wireless communication system. More particularly, the present invention relates to a method and apparatus for transmitting and/or receiving a synchronization signal.

BACKGROUND ART

With appearance and spread of machine-to-machine (M2M) communication, machine type communication (MTC), and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

As the density of nodes increases and/or the density of user equipments increases, a method for efficiently using a high density of nodes or a high density of user equipments for communication is needed.

In addition, with advances in technology, usage of conventionally unused frequency bands has been discussed. Since a newly introduced frequency band has different frequency characteristics from an existing frequency band, it is difficult to apply an existing frame structure without change. Therefore, introduction of a new frame structure is needed.

In addition, a method for enabling the UE to recognize a newly introduced frequency band is also needed.

The technical objects that can be achieved through the present invention are not limited to what has been particularly described hereinabove and other technical objects not described herein will be more clearly understood by persons skilled in the art from the following detailed description.

Technical Solutions

The present invention provides a synchronization signal transmission method and a user equipment, and a synchronization signal reception method and a base station, for predefining time-frequency resources capable of being used to transmit or receive a synchronization signal and implicitly indicating or acquiring system information of a cell using the synchronization signal by employing the time-frequency resources.

In an aspect of the present invention, provided herein is a method for receiving a synchronization signal by a user equipment, including receiving the synchronization signal on one synchronization signal resource among a plurality of synchronization signal resource candidates; and acquiring system information of a cell based on based on determination as to which synchronization signal resource candidate among the plurality of synchronization signal resource candidates is the synchronization signal resource carrying the synchronization signal. A cell identity of a cell including the synchronization signal may be detected, time synchronization with the cell may be acquired, length information of a cyclic prefix (CP) applied to the cell may be acquired, and/or a type of a base station transmitting the synchronization signal may be identified, based on determination as to which synchronization signal resource candidate among the plurality of synchronization signal resource candidates is the synchronization signal resource carrying the synchronization signal.

In another aspect of the present invention, provided herein is a user equipment for receiving a synchronization signal, including a radio frequency (RF) unit and a processor configured to control the RF unit. The processor may control the RF unit to receive the synchronization signal on one synchronization signal resource among a plurality of synchronization signal resource candidates. The processor may be configured to detect a cell identity of a cell including the synchronization signal, acquire synchronization with the cell, acquire length information of a cyclic prefix (CP) applied to the cell, and/or identify a type of a base station transmitting the synchronization signal, based on determination as to which synchronization signal resource candidate among the plurality of synchronization signal resource candidates is the synchronization signal resource carrying the synchronization signal.

In another aspect of the present invention, provided herein is a method for transmitting a synchronization signal by a base station, including transmitting the synchronization signal on at least one synchronization signal resource among a plurality of synchronization signal resource candidates. The synchronization signal may be transmitted on a synchronization signal resource, corresponding to a cell identity of a cell associated with the synchronization signal, time synchronization of the cell, a cyclic prefix (CP) length applied to the cell, or a type of the base station.

In another aspect of the present invention, provided herein is a base station for transmitting a synchronization signal, including a radio frequency (RF) unit and a processor configured to control the RF unit. The processor may control the RF unit to transmit the synchronization signal on a synchronization signal resource, corresponding to a cell identity of a cell associated with the synchronization signal, time synchronization of the cell, a cyclic prefix (CP) length applied to the cell, or a type of the base station, among a plurality of synchronization signal resource candidates.

In each aspect of the present invention, wherein each synchronization signal resource candidate of the plurality of synchronization signal resource candidates may be defined at least by one or more frequency resources among a plurality of predesignated frequency resources or by one or more time resources among a plurality of predesignated time resources.

In each aspect of the present invention, the plurality of predefined frequency resources may be orthogonal, and each of the plurality of predefined frequency resources may be configured with consecutive subcarriers on a frequency axis.

In each aspect of the present invention, the plurality of predesignated time resources may correspond respectively to a plurality of orthogonal frequency division multiplexing (OFDM) symbols. The plurality of OFDM symbols may be configured in every 'G' (≥1) OFDM symbols in a time domain.

In each aspect of the present invention, the plurality of synchronization signal resource candidates may be predefined to correspond one-to-one to a plurality of cell identity groups into which a plurality of cell identities is grouped or to the plurality of cell identities, In each aspect of the present invention, one or more synchronization signal resource candidates among the plurality of synchronization signal resource candidates may be predefined to correspond one-to-one to one or more subframes in a frame including a plurality of subframes.

In each aspect of the present invention, each synchronization signal resource candidate among the plurality of synchronization signal resource candidates may be predefined to correspond to one of a plurality of CP lengths.

In each aspect of the present invention, each synchronization signal resource candidate among the plurality of synchronization signal resource candidates may be predefined to correspond to one of a plurality of base station types.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, efficient signal transmission/reception can be performed on a newly introduced frequency band. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 illustrates a mapping example of a synchronization signal detection resource and eNB type information according to an embodiment of the present invention.

MODE FOR CARRYING OUT THE INVENTION

Figure 1:
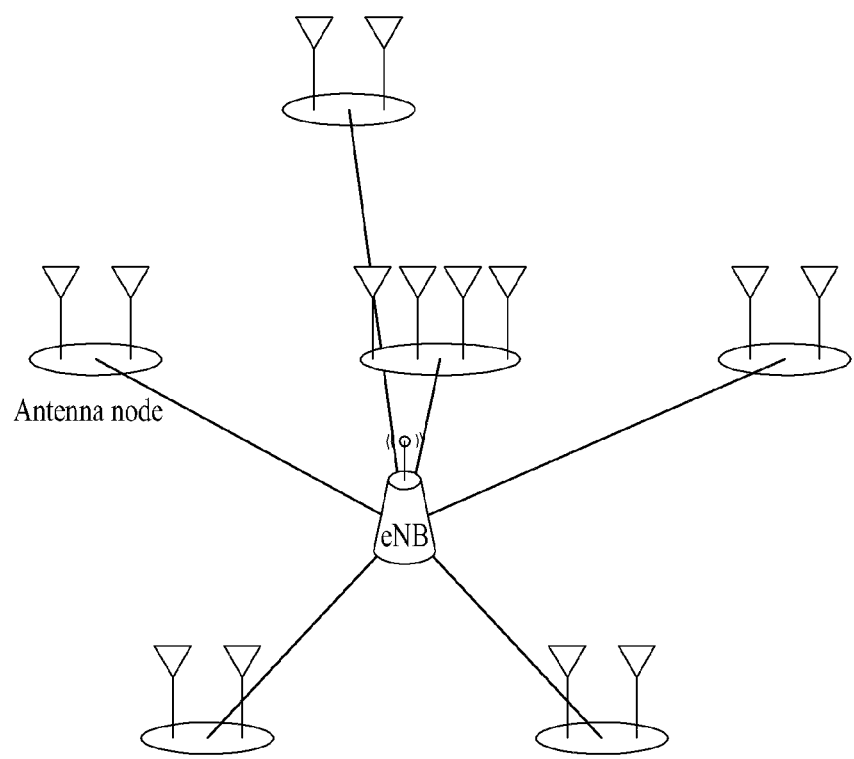
FIG. 1 illustrates a distributed antenna system (DAS) which is a type of multi-node system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a subframe in which a broadcast signal is transmitted is referred to as a broadcast subframe or physical broadcast channel (PBCH) subframe and a subframe in which a synchronization signal (e.g. a primary synchronization signal (PSS) and/or a secondary synchronization signal (SSS)) is transmitted is referred to as a synchronization signal subframe or a PSS/SSS subframe. An OFDM symbol/subcarrier/RE on which a PSS/SSS is allocated or configured is referred to as a PSS/SSS symbol/subcarrier/RE, respectively. Here, the RE indicates a resource element.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving radio signals for communicating with a UE. Although the UE is also called a node or a point in a specific radio communication standard, the term node in the present invention is used as concept which contrasts with the UE. The node may be referred to as an access point or an access node in that the node is not a UE but a point that the UE accesses.

Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU).

The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

FIG. 1 illustrates a distributed antenna system (DAS) which is a type of multi-node system.

Referring to FIG. 1, the DAS includes an eNB and antenna nodes connected to the eNB. An antenna node may be referred to as an antenna group, an antenna cluster, etc. The antenna node is connected to the eNB by wire or wirelessly and may include one or multiple antennas. Generally, antennas belonging to one antenna node have characteristics of being in the same regional spot, wherein the distance between nearest antennas is within a few meters. The antenna node serves as an antenna point that a UE may access.

Unlike a centralized antenna system (CAS) in which antennas of the eNB are centralized in the middle of a cell, the DAS is a system in which antennas managed by one eNB are distributed at various positions in a cell. The DAS is different from a femto cell or a pico cell in that multiple antenna nodes, that are not recognized as being located at one point because the antenna nodes are separately deployed at a predetermined interval, constitute one cell. The DAS of an early stage has been used to repeatedly transmit the same signal by further installing antennas in order to cover shadow zones. However, in a broad sense, the DAS is similar to a multiple input multiple output (MIMO) system in that the antennas of the eNB simultaneously transmit or receive multiple data streams to support one or multiple UEs. However, in conventional MIMO technology, antennas centralized in one point of the eNB participate in communication with the UE, whereas, in the DAS, at least one of distributed nodes of the eNB participates in communication with the UE. Therefore, the DAS has advantages of high power efficiency obtained by further reducing the distance between the UE and an antenna in comparison with the CAS, high channel capacity caused by low correlation and interference between eNB antennas, and guarantee of communication performance of relatively uniform quality regardless of the location of the UE in a cell.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC).

Although the UE is in RRC-CONNECTED state, if it is not configured by carrier aggregation or does not support carrier aggregation, a single serving cell configured by the PCell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Figure 2:
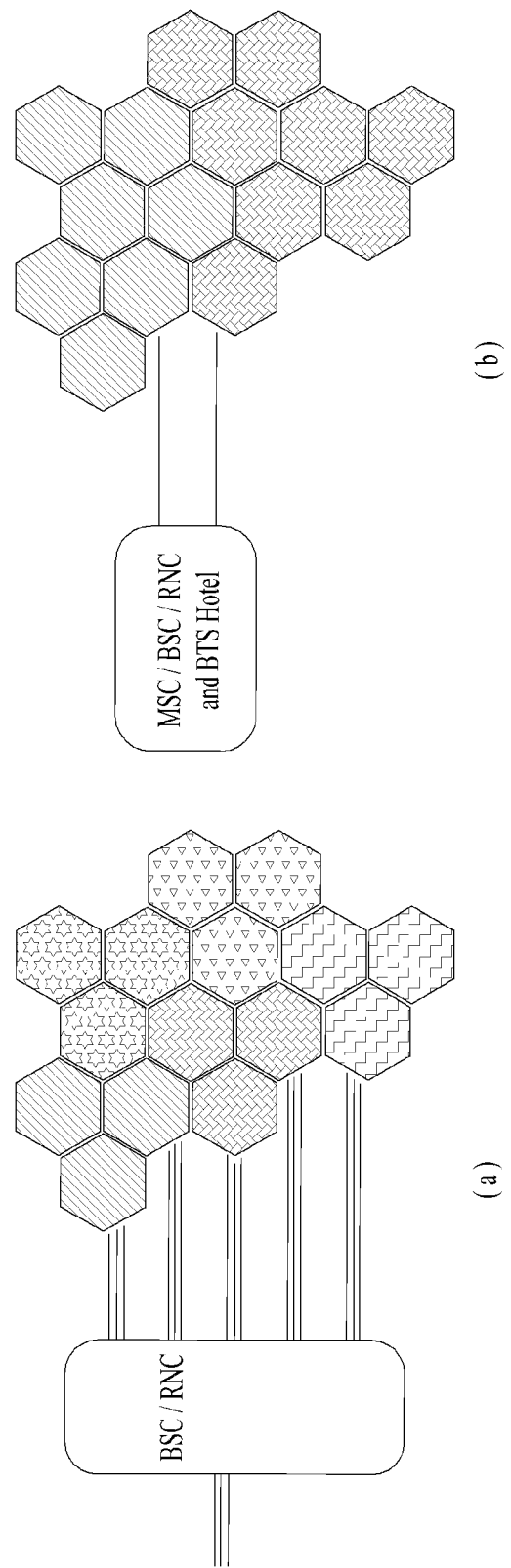
FIG. 2 is a diagram for explaining the concept of a base transceiver station (BTS) hotel of a multi-node system.

FIG. 2 is a diagram for explaining the concept of a base transceiver station (BTS) hotel of a multi-node system. In particular, FIG. 2(a) illustrates a traditional radio access network (RAN) architecture and FIG. 2(b) illustrates a small cell RAN architecture with a BTS hotel and a DAS. The concept of a small cell will be described in more detail with reference to FIG. 4.

Referring to FIG. 2(a), in a conventional cellular system, one BTS manages three sectors and each eNB is connected via a backbone network to a base station controller (BSC)/radio network controller (RNC). However, in a multi-node system such as a DAS, eNBs connected to respective antenna nodes may gather in one place (BTS hotel). Then, land in which the eNBs are to be installed and cost of buildings for installing the eNBs can be reduced and maintenance and management of the eNBs can be easily performed in one place. In addition, backhaul capacity can be increased by installing the BTS and a mobile switching center (MSC)/BSC/RNC together in one place.

Figure 3:
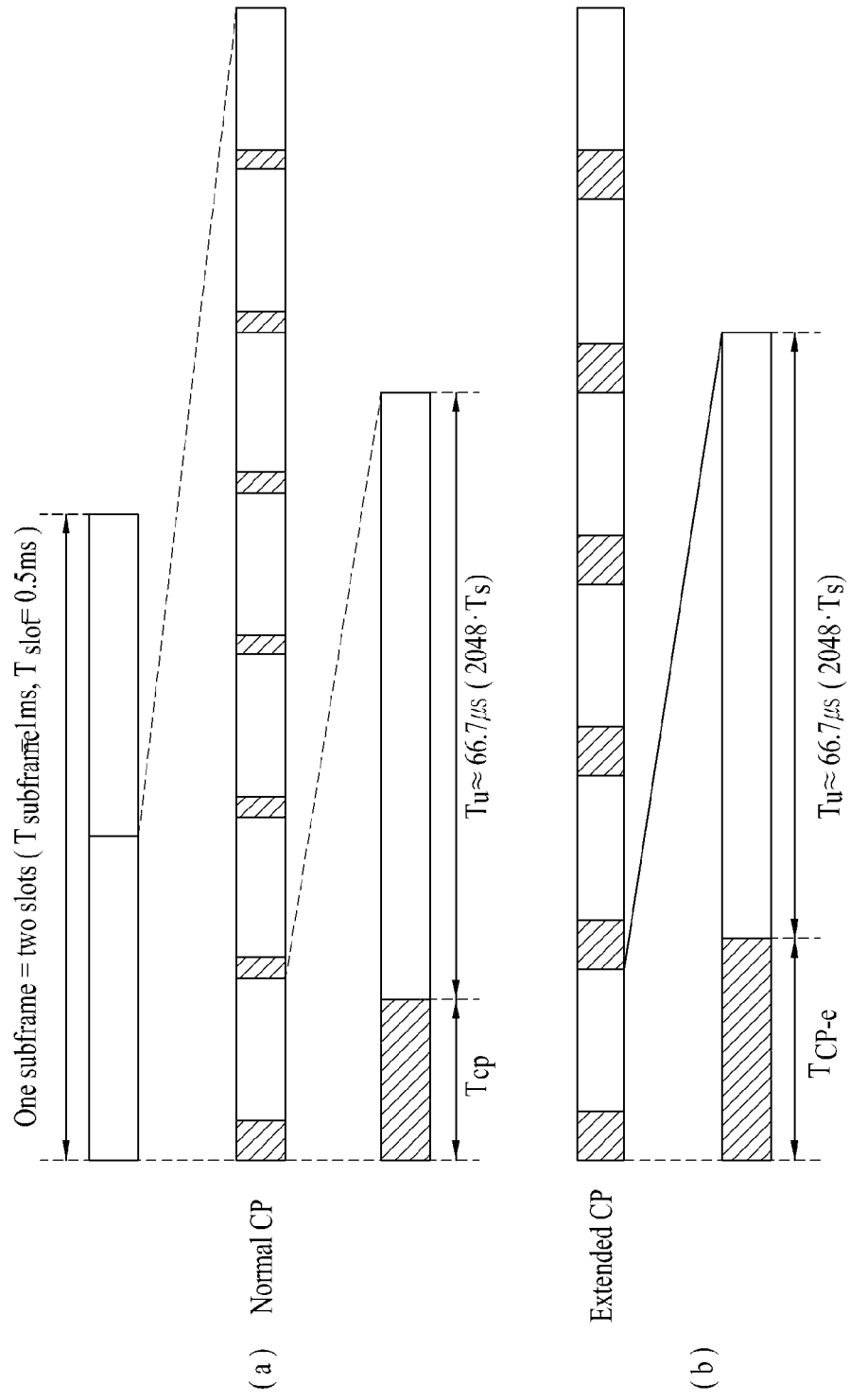
FIG. 3 illustrates a symbol structure used in a long term evolution (LTE) system.

FIG. 3 illustrates a symbol structure used in a long term evolution (LTE) system.

The duration $T_f$ of a radio frame used in a legacy LTE/LTE-A system is 10 ms (307200·T) and one radio frame includes 10 equal-sized subframes (SF). The 10 SFs in one radio frame may be assigned respective numbers. Here, $T_s$ denotes a sampling time, expressed by $T_s=1/(2048*15 \text{ kHz})$. The length $T_{subframe}$ of each SF is 1 ms and one SF includes two slots. Therefore, one radio frame includes 20 slots each having a length $T_{slot}$ of $15360·T_s=0.5$ ms. The 20 slots in one radio frame may be sequentially numbered from 0 to 19. The time for transmitting one SF is defined as a transmission time interval (TTI). A time resource may be distinguished by a radio frame number (also called a radio frame index), an SF number (also called an SF number), a slot number (also called a slot index), etc.

The legacy LTE/LTE-A system supports two types of frame structures according to the length of a cyclic prefix (CP) as illustrated in FIG. 3. Referring to FIG. 3(a), in the case of a normal CP, one slot includes 7 OFDM symbols, whereas, in the case of an extended CP, one slot includes 6 OFDM symbols. For reference, an OFDM symbol may be called an OFDM symbol or a single carrier-frequency division multiplexing (SC-FDM) symbol according to a multiple access scheme. Since SC-FDMA may be regarded as a special case of OFDMA, the term "symbol" or "OFDMA symbol" in the present invention is used to indicate an OFDM symbol and an SC-FDM symbol.

In FIG. 3, the length $T_{CP}$ of the normal CP is $160·T_s \approx 5.1$ μs in the first OFDM symbol of an SF and is $160·T_s \approx 4.7$ μs in the case of each of the other OFDM symbols of the SF. In FIG. 3, the length $T_{CP\text{-}e}$ of the extended CP is $512 \cdot T_s \approx 16.1$ µs. In FIG. 3, $T_u$ denotes an effective OFDM symbol period representing time corresponding to the inverse of a subcarrier spacing.

The reason why an LTE/LTE-A system supports two CPs is that the LTE system is to support various scenarios of a cellular system. In actuality, the LTE system covers indoor, urban, suburban, and rural environments and supports a mobile speed of the UE up to 350 to 500 km.

A center frequency on which the LTE/LTE-A system operates is generally 400 MHz to 4 GHz and an available frequency band of the LTE/LTE-A system is 1.4 to 20 MHz. This means that delay spread and Doppler's frequency differ according to the center frequency and the available frequency band. In the case of the normal CP, a subcarrier spacing is $\Delta f = 15$ kHz and the length of the CP is about 4.7 µs. In the case of the extended CP, the subcarrier spacing is the same as that of the normal CP and the length of the CP is about 16.7 µs. In the LTE system, the subcarrier spacing is predetermined and corresponds to a value obtained by dividing a sampling frequency by a fast Fourier transform (FFT) size. In the LTE system, a sampling frequency of 30.72 MHz is used and the subframe spacing $\Delta f = 15$ kHz may be obtained by dividing 30.72 MHz by 2048 which is the FFT size used in the LTE system.

The extended CP may be used for a suburban cell or a rural cell which has relatively wide coverage due to a long CP duration. Generally, since delay spread increases in the suburban cell or the rural cell, the extended CP having a relatively long length is needed in order to solve inter-symbol interference (ISI). In the case of the extended CP, since CP overhead increases relative to the normal CP, there is a trade-off in that increase in a CP length causes loss of spectral efficiency and/or a transmission resource. Consequently, in the LTE/LTE-A system, the length of the normal CP and the length of the extended CP have been determined to support various deployment scenarios in which a cell is deployed in indoor urban, suburban, and rural environments. In determining the length of the CP, the following design criteria have been used.

$$T_{CP} \geq T_d \quad \text{[Equation 1]}$$

$$\frac{f_{dmax}}{\Delta f} \ll 1 \quad \text{[Equation 2]}$$

$$T_{CP}\Delta f \ll 1 \quad \text{[Equation 3]}$$

In Equation 1 to Equation 3, $T_{SP}$ denotes the length of a CP, $f_{dmax}$ denotes a (maximum) Doppler's frequency, and $\Delta f$ denotes a subcarrier spacing. In Equation 1, $T_d$ denotes a maximum excess delay or a maximum channel delay, indicating the delay time of the last channel tap when a power delay profile (PDF) called a channel delay profile is given. For example, if the PDF is given such that the delay and power (relative power) of tap #0 are 10 ns and 0 dB, respectively, the delay and power (relative power) of tap #1 are 20 ns and −5 dB, respectively, . . . , and the delay and power (relative power) of tap #N are 500 ns and −20 dB, respectively, then $T_d$=500 ns.

Equation 1 indicates a criterion for preventing ISI, Equation 2 indicates a criterion for maintaining inter-cell interference (ICI) at a sufficiently low level, and Equation 3 indicates a criterion for spectral efficiency.

A UE accesses a CC or a cell that uses the CC by performing cell search. Cell search refers to a procedure in which the UE acquires time and frequency synchronization with a CC and detects a (physical layer) cell identity (ID) of the CC. Cell search may also be understood as a procedure of acquiring time and frequency synchronization with a cell that uses the CC and detecting a cell ID of the cell. In a legacy LTE system, cell search is based on a PSS and an SSS. A cell search procedure using the PSS/SSS in the legacy LTE system is as follows.

Figure 4:
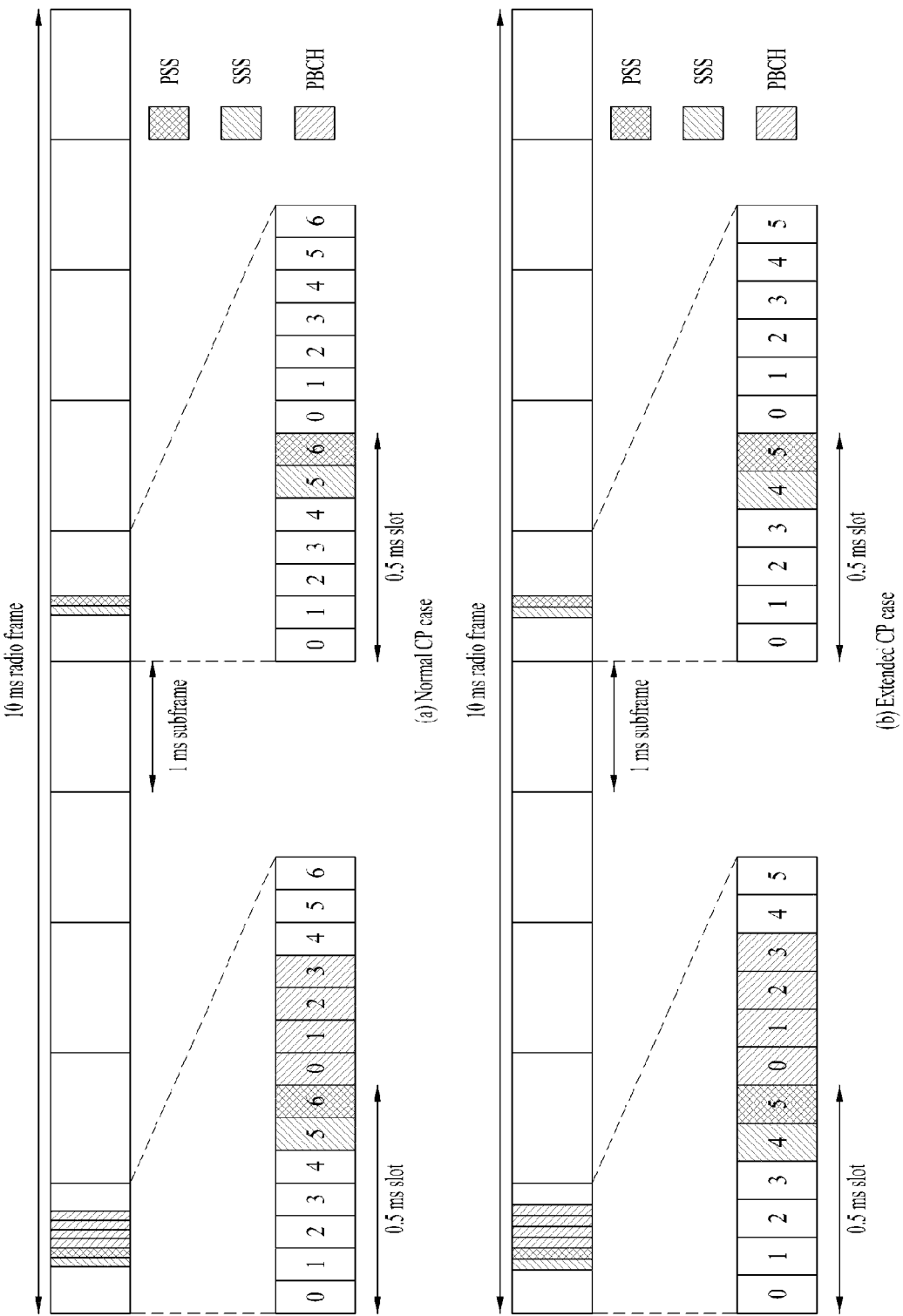
FIG. 4 illustrates a radio frame structure for transmission of a synchronization signal (SS).

FIG. 4 illustrates a radio frame structure for transmission of a synchronization signal (SS). Specifically, FIG. 4 illustrates a radio frame structure for transmission of an SS and a PBCH in frequency division duplex (FDD), wherein FIG. 4(a) illustrates transmission locations of an SS and a PBCH in a radio frame configured as a normal cyclic prefix (CP) and FIG. 4(b) illustrates transmission locations of an SS and a PBCH in a radio frame configured as an extended CP.

Referring to FIG. 4, SSs are categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used).

Referring to FIG. 4, each of the PSS and the SSS are transmitted on two OFDM symbols in every radio frame. More specifically, the SSs are transmitted in each of the first slot of subframe 0 and the first slot of subframe 5 in consideration of a global system for mobile communication (GSM) frame length of 4.6 ms, for ease of inter-radio access technology (RAT) measurement. Particularly, the PSS is transmitted on the last OFDM symbol of the first slot of subframe 0 and on the last OFDM symbol of the first slot of subframe 5 and the SSS is transmitted on the second-to-last OFDM symbol of the first slot of subframe 0 and on the second-to-last OFDM symbol of the first slot of subframe 5. A boundary of the radio frame may be detected through the SSS. The PSS is transmitted on the last OFDM symbol of a corresponding slot and the SSS is transmitted on the OFDM symbol immediately prior to the PSS. A transmit diversity scheme of an SS uses only a single antenna port and is not separately defined in standards. That is, a single antenna port transmission scheme or a transparent transmission scheme for a UE (e.g. precoding vector switching (PVS), time switched transmit diversity (TSTD), or cyclic delay diversity (CDD)) may be used for the transmit diversity scheme of the SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ ($=3N^{(1)}_{ID}+N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS.

The PSS is mapped to 6 RBs (=72 subcarriers) near a center frequency. Among the 72 subcarriers, the 9 remaining subcarriers always carry a value of 0, thereby functioning as an element which facilitates filter design for performing synchronization.

Referring to FIG. 4, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Referring to FIG. 4, since the distance between SSs in a normal CP is different from the distance between SSs in an extended CP, the UE may be aware of whether a corresponding cell uses the normal CP or the extended CP by detecting SSs.

Meanwhile, in a future LTE system, introducing a local area is considered. That is, introduction of new cell deployment of the concept called local area access is considered in order to further strengthen service support for each user or UE. Such a local area is referred to as a small cell.

Figure 5:
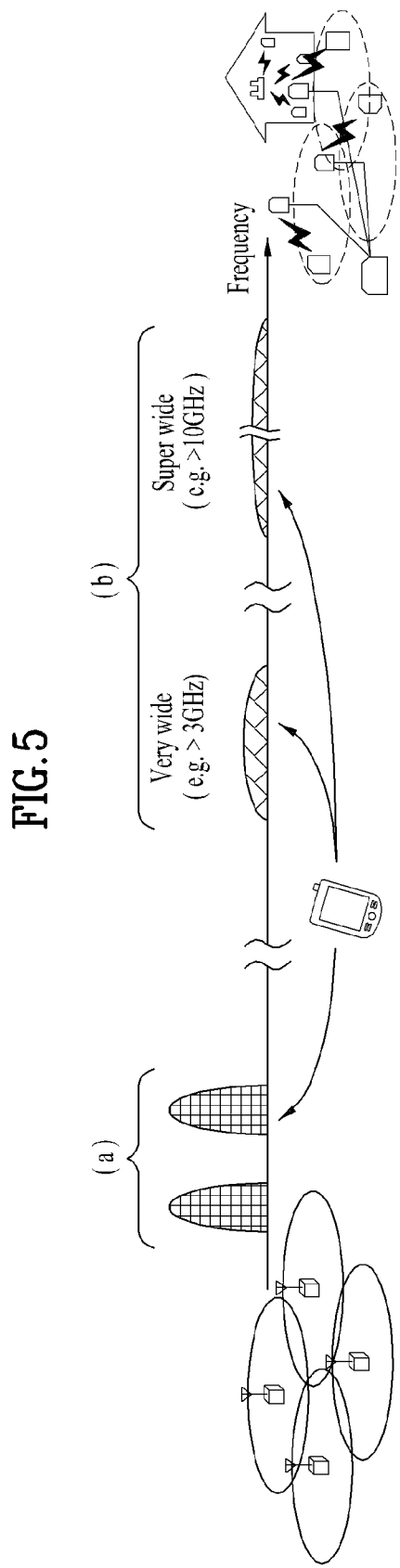
FIG. 5 is a diagram for explaining the concept of a small cell.

FIG. 5 is a diagram for explaining the concept of a small cell.

Referring to FIG. 5, a system bandwidth wider than a system bandwidth of a legacy LTE system may be configured for the small cell in a band having a higher center frequency than a center frequency operating in the legacy LTE system. If the small cell is used, basic cell coverage is supported based on a control signal such as system information through an existing cellular band and a wider frequency band is used in the small cell of a high frequency, so that data transmission efficiency can be maximized. Accordingly, local area access may be used for low-to-medium mobility UEs located in a narrow area and may be used for communication of small cells in which the distance between a UE and an eNB is in units of 100 m, which is smaller than an existing cell in which the distance between the UE and the eNB is in units of km.

In the small cells, channel characteristics described below are expected due to a short distance between a UE and a node and use of a high frequency band.

1) Delay spread: Delay of a signal may be shortened due to a short distance between an eNB and a UE.

2) Subcarrier spacing: If the same OFDM based frame structure as a frame structure of the LTE system is applied, since an allocated frequency bandwidth is wide, a value which is remarkably greater than an existing subcarrier spacing of 15 kHz may be configured as a subcarrier spacing.

3) Doppler's frequency: Since a high frequency band is used, a higher Doppler's frequency than a frequency when a low frequency band is used for a UE moving at the same speed may appear. Then, a coherent time which is a time duration during which a channel impulse response in a communication system is regarded as invariant may be remarkably shortened.

Due to these characteristics of a high frequency band, if an existing frame structure is applied to the high frequency band, ISI and ICI cannot be effectively prevented and spectral efficiency can be lowered. Therefore, the present invention proposes a frame structure for transmission on the high frequency band.

Generally, in the high frequency band having a center frequency $f_c$ of 5 GHz or more, delay spread of a channel tends to be shortened. In addition, path loss of the channel is greatly increased as a frequency band becomes high and thus stable performance can be guaranteed as the distance between the eNB and the UE decreases. Accordingly, future communication using the high frequency band is expected to employ a narrower cell structure than existing cellular communication and to identically use OFDM which is a multiple access scheme due to ease of resource utilization and control.

Due to the difference in frequency characteristics between an existing available frequency band and a frequency band to be newly used and difference in communication environments between an existing cell and a small cell to be newly deployed, it is difficult to use an existing frame structure, a synchronization signal transmission structure, etc. without change. Therefore, the present invention proposes a synchronization signal transmission method for high frequency band transmission which is expected to be introduced in the future.

When channel characteristics of a high frequency band and/or channel characteristics of a small cell are considered, the UE cannot acquire time/frequency synchronization of sufficient performance with a cell or a CC (hereinafter, a cell/CC) through an existing single (OFDM) symbol and/or single sequence based synchronization signal as in LTE. Accordingly, the present invention proposes a new synchronization signal transmission/reception method suitable for a next generation communication system. The synchronization signal transmission/reception method according to the present invention is designed in consideration of the following requirements and/or to satisfy the following requirements.

1. Increase of a Center Frequency of a Service Band (High Frequency Band Needs)

A center frequency band higher than 5 GHz or a few tens of GHz rather than a channel environment of 5 GHz or less, that a legacy cellular system or Wi-Fi uses, is being discussed. This is because an effective and available band no longer remains in a frequency band around existing 2 GHz and there is a low probability that a wider frequency band can be ensured only by an existing available frequency band. In addition, due to numerous restrictions the existing available frequency band already designated by various standards, there may be many constraints in usage change and utilization of the existing available frequency band.

2. Wide System Bandwidth Needs

In next generation communication, a transmission rate needed by a user is expected to evolve from an existing full high definition (HD) based service to a service requiring a transmission rate of ultra (high) definition (UD) class or more. Accordingly, in order to support such a high transmission rate, it is necessary to provide a communication service using a wider bandwidth. When a communication service using a bandwidth above a few hundred MHz or above a few GHz, which is remarkably wider than an existing system bandwidth, is provided, determination is needed as to whether it is desirable that a synchronization signal be transmitted over an entire available frequency bandwidth or only in a restricted partial band.

3. Small Cell Based High-Density Cell Deployment

As mentioned above, a high-density small cell has been discussed as one evolving direction of next generation communication. High-density small cell deployment seems to the most efficient method capable of supporting a communication service of a higher transmission rate for a user and denser cell deployment may maximally improve overall system capacity. However, if a synchronization signal is transmitted over an entire band of a few GHz in small cells having a low transmit power of an eNB, since a transmit power of each subcarrier of a synchronization signal at one transmission timing of the synchronization signal will be lowered, strength of the synchronization signal received by the UE is also lowered. Then, quality of the synchronization signal received by the UE will be degraded and synchronization acquisition performance of the UE may be deteriorated.

In consideration of such characteristics of the small cell and the high frequency band, the present invention proposes transmitting the synchronization signal in a limited specific region rather than in an entire frequency band, in a next generation communication system for providing a service using a frequency band having a system bandwidth of a few hundred MHz or a few GHz. According to the present invention, since the synchronization signal is limitedly transmitted in a specific time-frequency region, a transmit power of the synchronization signal may be intensively allocated. In addition, since an existing PSS/SSS of LTE/LTE-A is transmitted on a predefined OFDM symbol in 6 RBs near a center frequency, synchronization signals of small cells have a high probability of interfering with each other in the small cells having a high deployment density. In contrast, according to the present invention, since a plurality of time-frequency resources on which a synchronization signal may be transmitted is defined along a time axis and/or a frequency axis, synchronization signals of neighboring cells may be adjusted to be transmitted on different time-frequency resources. Therefore, according to the present invention, ICI caused by the synchronization signals can be eliminated or relieved.

Figure 6:
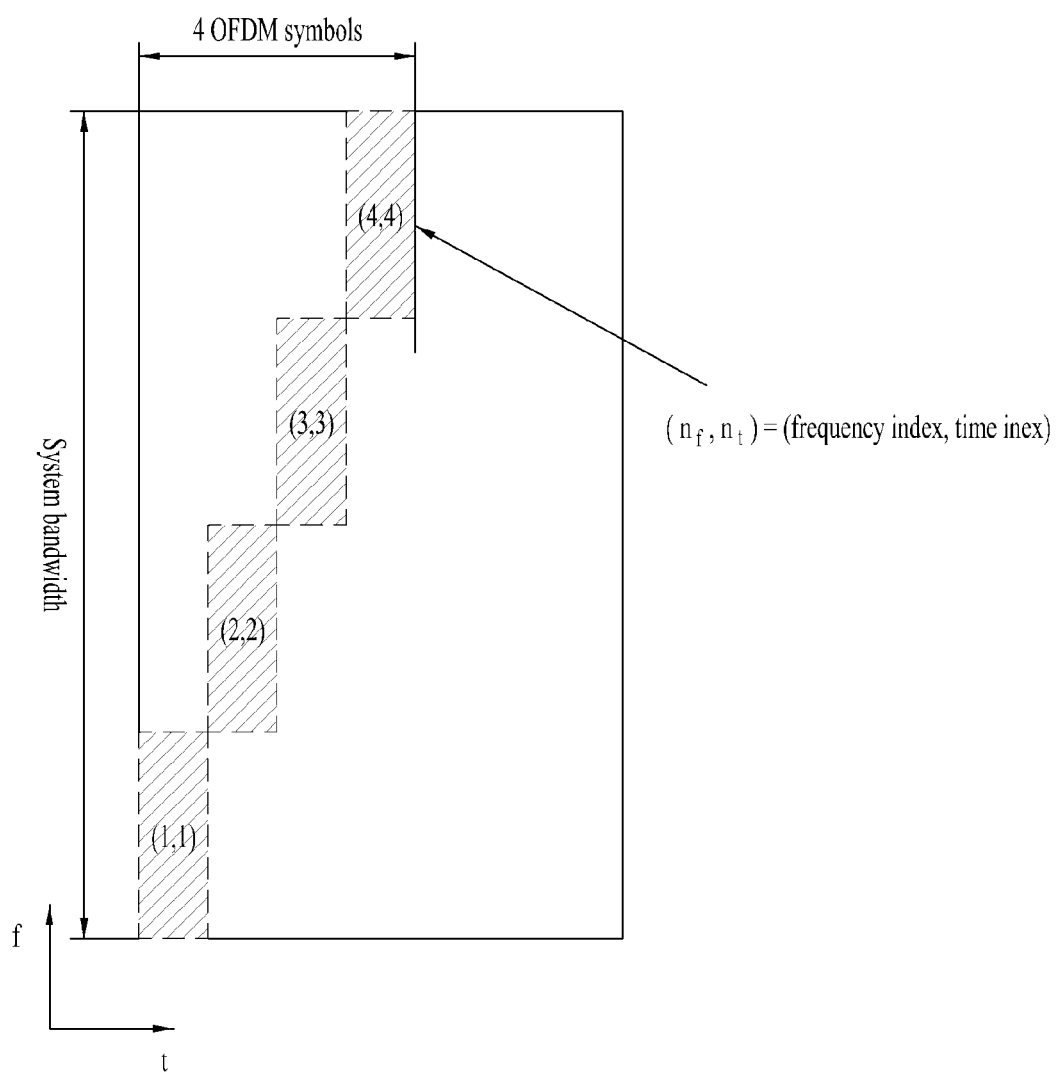
FIG. 6 illustrates an example of a synchronization signal transmission method according to an embodiment of the present invention.

FIG. 6 illustrates an example of a synchronization signal transmission method according to an embodiment of the present invention.

Referring to FIG. 6, if resources in which a synchronization signal can be transmitted are divided into four resources in the frequency domain and four resources in the time domain, the time-frequency resources carrying the synchronization signal may be identified by a frequency index $n_f$ and a time index $n_t$. Although an example of using one of four frequency resources and one of four time resources to transmit one synchronization signal is shown in FIG. 6, more than one frequency resource and more than one time resource may be respectively selected in the frequency domain and the time domain.

Therefore, if a specific system bandwidth is divided into 'N' bandwidths and the number of transmission symbols in the time axis is 'M', a synchronization signal according to the present invention may be transmitted in one of $(\Sigma_{n=1}^{N} {}_N C_n) \times (\Sigma_{m=1}^{M} {}_M C_m)$ time-frequency resource combinations. In this case, the frequency index $n_f$ may indicate one of $\Sigma_{n=1}^{N} {}_N C_n$ frequency resource combinations and the time index $n_t$ may indicate one of $\Sigma_{n=1}^{M} {}_M C_m$ time resource combinations.

Hereinafter, detailed application examples of allocating the synchronization signal by dividing a time-frequency resource region according to the present invention will be described.

Proposal 1) A UE May Acquire Cell ID or Cell ID Group Information of a Service eNB Through a Time-Frequency Resource on which a Synchronization Signal is Detected or Transmitted.

When a synchronization signal is transmitted or received by dividing a time-frequency resource region of a system, a cell ID or a cell ID group indicated by each region may be predefined. As such, the UE may implicitly acquire cell ID information from a resource region in which the synchronization signal is detected. For example, if a frequency band of a corresponding cell/CC is divided into 'N' synchronization signal detection bands and each detection band can be used to transmit the synchronization signal, the UE may be aware of cell ID information of an eNB that the UE currently accesses (hereinafter, a service eNB) through acquisition of final information about a synchronization signal detection band in which the synchronization signal is actually detected. If the number of cell IDs is greater than the number 'N' of divided frequency bands, the synchronization signal detection band in which the synchronization signal is detected may be used as information for distinguishing between cell ID groups each including a cell ID set. For example, cell IDs may be divided into N cell ID groups each including L (e.g. 10) cell IDs.

TABLE 1

| Synchronization signal detection index | Corresponding Cell ID/Cell ID group | Cell ID information |
| --- | --- | --- |
| 0 | 0 | {0, 1, 2, 3, 4, 5, 6, 7, 8, 9} |
| 1 | 1 | {10, 11, 12, 13, 14, 15, 16, 17, 18, 19} |
| ... | ... | ... |
| N − 1 | N − 1 | (N − 1) × 10 + {0, 1, 2, 3, 4, 5, 6, 7, 8, 9} |

Referring to Table 1, if the number of synchronization signal detection regions is N in which the UE can detect the synchronization signal and if the number of cell ID information related to each region is 10, 10×N cell IDs may be associated with N synchronization signal detection regions. In other words, a predetermined number of time-frequency resources in which an eNB is capable of transmitting the synchronization signal may be predefined and the eNB may carry the synchronization signal on a time-frequency resource corresponding to a cell ID of a cell/CC controlled or managed thereby among the predefined time-frequency resources. Among resources in a frequency band of a cell that the UE desires to access or a cell/CC for which the UE is performing cell search, since the UE can acquire a synchronization signal of the cell/CC on the predefined time-frequency resources, the predefined time-frequency resources become synchronization signal detection resource candidates in which the UE can detect the synchronization signal of the cell/CC. The UE may detect the synchronization signal on one of the predefined time-frequency resources by monitoring the predefined time-frequency resources. The UE may be aware of a cell ID of the cell/CC or a cell ID group to which the cell ID belongs based on determination as to on which resource of the predefined time-frequency resources the synchronization signal is actually detected.

Figure 7:
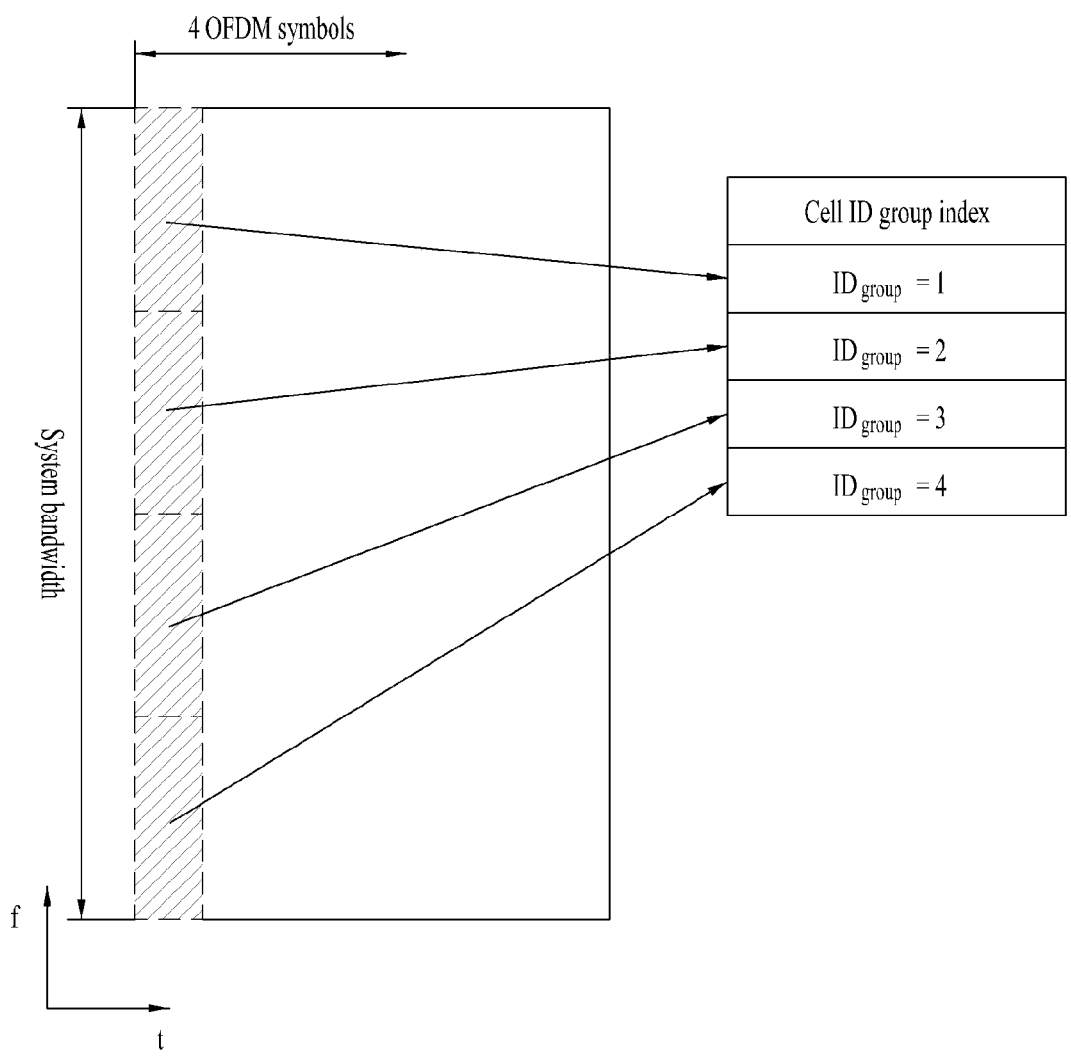
FIG. 7 illustrates a mapping example of a synchronization signal detection resource and cell identity (ID) information according to an embodiment of the present invention.

FIG. 7 illustrates an example of mapping a synchronization signal detection resource and cell ID information according to an embodiment of the present invention.

Referring to FIG. 7, four cell ID groups may be respectively mapped to a total of four synchronization signal detection bands. For example, four synchronization signal detection bands may be mapped in one-to-one correspondence to cell ID groups 1, 2, 3, and 4. Although FIG. 7 illustrates the case in which all of predefined synchronization signal detection bands are located on one OFDM symbol, i.e. the case in which all time resources of the predefined synchronization signal detection bands are the same, it is possible to define synchronization signal detection resources such that respective time resources of the predefined synchronization signal detection bands differ as opposed to FIG. 7. In other words, although all of the synchronization signal detection resources associated with all cell IDs may be configured on one OFDM symbol so that the (minimum) interval between synchronization signal detection time resources becomes 0, the synchronization signal detection resources may be configured on the time axis such that the (minimum) interval between the synchronization signal detection time resources becomes G (≥1).

For instance, referring to FIG. 6, the four synchronization signal detection bands may be dispersedly deployed on the four OFDM symbols. Although consecutive time resources may be used as time resources of the synchronization signal detection bands such that the (minimum) interval between time resources of the synchronization signal detection resources is one OFDM symbol as illustrated in FIG. 6, OFDM symbols of an interval greater than one OFDM symbol may be used as the time resources of the synchronization signal detection bands.

The eNB may transmit the synchronization signal through a synchronization signal detection band corresponding to a cell ID group to which a corresponding cell ID belongs and the UE may monitor four synchronization signal detection bands and detect the synchronization signal in one of the four synchronization signal detection bands. The UE may identify a cell ID group to which a cell ID of a cell/CC using the synchronization signal according to in which one of the four synchronization signal detection bands the synchronization signal is detected, i.e. according to which one of the four synchronization signal detection bands carries the synchronization signal.

When the synchronization signal detection resources are mapped in one-to-one correspondence to the cell IDs, if the UE is aware of a synchronization signal detection resource carrying the synchronization signal, the UE may determine that a cell ID corresponding to the synchronization signal detection resource to be a cell ID of a corresponding cell/CC. If the number of cell IDs is greater than the number of synchronization signal detection resources, the synchronization signal detection resources may be respectively mapped to a plurality of cell ID groups having grouped cell IDs used in a system. The UE may identify a cell ID group to which a cell ID of a corresponding cell/CC belongs by detecting the synchronization signal on one synchronization signal detection resource among a plurality of synchronization signal detection resources, i.e. by detecting a synchronization signal detection resource actually carrying the synchronization signal. A cell ID of a corresponding cell/CC among cell IDs of a corresponding cell ID group may be distinguished by other methods. For example, different synchronization signal sequences corresponding to the number of cell IDs belonging to one group may be defined, a cell ID group to which a corresponding cell ID belongs may be identified by a synchronization signal detection resource carrying the synchronization signal, and the cell ID among cell ID(s) in a corresponding cell ID group may be identified by a synchronization signal sequence.

Proposal 2) A UE May Acquire Network Synchronization (e.g. Frame Index and/or Subframe Index) Through a Time-Frequency Resource on which a Synchronization Signal is Detected or Transmitted.

When a synchronization signal is transmitted or received by dividing a time-frequency resource region of a system, frame or subframe information indicated by each region may be predefined. As such, the UE may implicitly acquire the frame or subframe information from a resource region on which the synchronization signal is detected and may establish synchronization with a network through the frame or subframe information. System frame information corresponding to network synchronization may be configured such that multiple frame indexes form one group using the same method as described in Proposal 1 or may be configured such that information corresponding to only one frame is associated with one time-frequency resource.

When a single frame consists of 'M' subframes and the number of time-frequency synchronization signal detection resources is 'N', if 'M=N', an index of a resource on which the synchronization signal is detected may be directly associated with a subframe index. For example, the UE may regard an index of a synchronization signal detection resource on which the synchronization signal is detected as an index of a subframe in which the synchronization signal is detected. If a frame consists of a total of four subframes and four synchronization signal detection resources are respectively located in the four subframes and are defined by different frequency resources, upon transmitting the synchronization signal in a subframe, the eNB may transmit the synchronization signal on a synchronization signal detection resource corresponding to an index of the subframe and, upon transmitting the synchronization signal in another subframe, the eNB may transmit the synchronization signal on a synchronization signal detection resource corresponding to an index of the other subframe. Then, the UE may be aware of an index of a subframe in which the synchronization signal is detected according to on which resource the synchronization signal is detected among the four synchronization signal detection resources.

Meanwhile, synchronization signal detection resources may be configured by different frequency resources on the same time axis. In this case, set information of frames/subframes may be mapped to each frequency resource. For example, if all synchronization signals are transmitted in the first subframe and subframe/frame indexes of 10 units are indicated per frequency resource, the UE may acquire information about (N×10) subframes in the process of a synchronization signal detection procedure for predefined synchronization signal detection resources.

For example, five synchronization signal detection resources may be defined and each synchronization signal detection resource may be associated with 10 consecutive subframes. That is, synchronization signal detection resources may be defined such that synchronization signal detection resource #0 corresponds to subframe #0 to subframe #9, synchronization signal detection resource #1 corresponds to subframe #10 to subframe #19, synchronization signal detection resource #2 corresponds to subframe #20 to subframe #29, synchronization signal detection resource #3 corresponds to subframe #30 to subframe #39, and synchronization signal detection resource #4 corresponds to subframe #40 to subframe #49. In this case, the eNB may transmit the synchronization signal in every 10 subframes, wherein the synchronization signal may be transmitted using a synchronization signal detection resource associated with corresponding subframes. For example, the eNB may transmit the synchronization signal in synchronization signal detection resource #0 of a predefined subframe (e.g. subframe #0) among subframe #0 to subframe #9. Upon detecting the synchronization signal in synchronization signal detection resource #0, the UE may determine that a subframe in which the synchronization signal is detected is the predefined subframe among subframe #0 to subframe #9.

As another example, synchronization signal detection resources {0, 1, 2, . . . , N'−1} may indicate information about a front part of a frame and synchronization signal detection resources {N', N'+1, . . . , N} may indicate information about a latter part of a frame. More specifically, if the synchronization signal is configured to be transmitted in subframe #0 and subframe #5 in a frame consisting of 10 subframes under the assumption that there are two synchronization signal detection resources, the UE may determine that a subframe in which the synchronization signal is detected is subframe #0 which is the front part subframe of the frame upon detecting the synchronization signal on synchronization signal detection resource #0 and determine that a subframe in which the synchronization signal is detected is subframe #5 which is the latter part subframe of the frame upon detecting the synchronization signal on synchronization signal detection resource #2.

Meanwhile, if the number 'M' of synchronization signal detection indexes is less than the number 'N' of synchronization signal detection resources, only 'M' synchronization signal detection resources among the 'N' synchronization signal detection resources may be mapped to synchronization signal detection indexes and the other synchronization signal detection resources may not be used. For example, if one frame consists of 15 subframes and the synchronization signal is transmitted in every five subframes, e.g. in subframe #0, subframe #5, and subframe #10, under the assumption that there are four synchronization signal detection resources, three synchronization signal detection resources are mapped in one-to-one correspondence to subframe #0, subframe #5, and subframe #10 and the other synchronization signal detection resources may be unused.

Proposal 3) A UE May Acquire CP Length Information of a Frame Structure Through a Time-Frequency Resource on which a Synchronization Signal is Detected or Transmitted.

Figure 8:
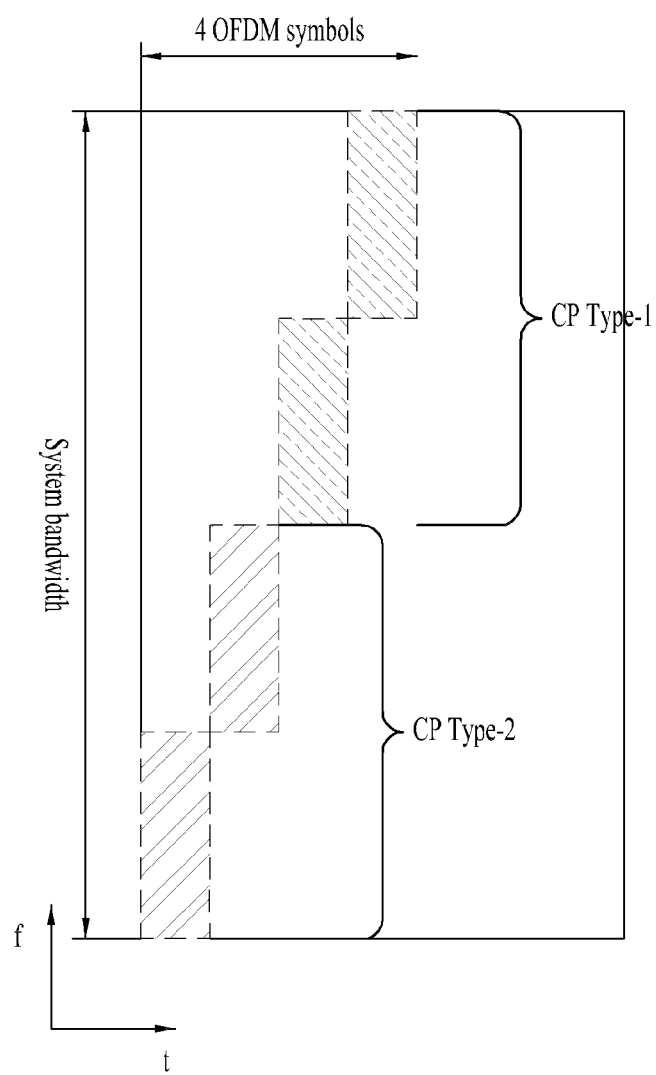
FIG. 8 illustrates a mapping example of a synchronization signal detection resource and cyclic prefix (CP) length information according to an embodiment of the present invention.

FIG. 8 illustrates a mapping example of a synchronization signal detection resource and CP length information according to an embodiment of the present invention.

If a next generation communication system uses a multiple CP structure as in a legacy LTE system, the UE according to the present invention may acquire CP information in a synchronization signal detection procedure.

Referring to FIG. 8, if it is assumed that a CP is divided into two types according to a CP length, the UE may implicitly acquire CP length information by dividing synchronization signal detection resources into two regions and mapping the two synchronization signal detection regions to CP type 1 and CP type 2, respectively. For example, the eNB may set a frame of a corresponding cell/CC to CP type 1 and transmit the synchronization signal on at least one of predefined synchronization signal detection resources corresponding to CP type 1 among the synchronization signal detection resources. Upon detecting the synchronization signal from synchronization signal detection resources associated to CP type 1 among the synchronization signal detection resources, the UE may determine that a CP length of a corresponding frame corresponds to CP type 1

Proposal 4) A UE May Identify a Type of a Service eNB (a Macro eNB, a Pico-Cell, a Femto-Cell, Etc.) Through a Time-Frequency Resource on which a Synchronization Signal is Detected or Transmitted.

FIG. 9 illustrates a mapping example of a synchronization signal detection resource and eNB type information according to an embodiment of the present invention.

A synchronization signal detection resource according to the present invention may be implicitly connected to a type of a service eNB. The UE may implicitly acquire type information of the service eNB that the UE has accessed according to a resource location in which the synchronization signal is detected. Generally, a data transmission rate and a service category may differ according to capability of each eNB. Therefore, according to the present invention, the UE may be configured to confirm the type of the service eNB based on a synchronization signal detection resource and actively request selection and change of a service point based on capability thereof or a communication environment. In addition, in a dense cell deployment situation, if a transmission resource of the synchronization signal varies with the type of the eNB, there is an advantage of successfully avoiding interference between initial synchronization signals.

Figure 10:
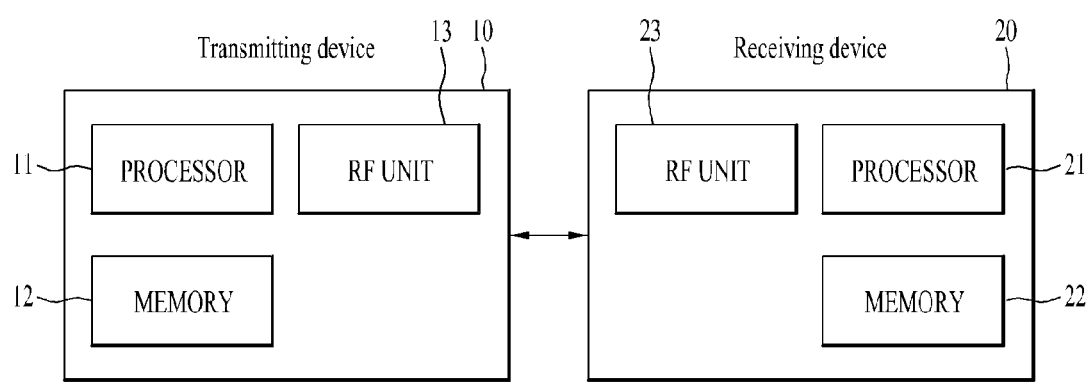
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, each node or transmission point includes an eNB RF unit. In the present invention, nodes participating in carrier aggregation may be managed by one or plural eNB processors. In other words, cells or CCs participating in carrier aggregation may be managed by the same eNB processor or different eNB processors.

In the present invention, a plurality of synchronization signal detection resources (also called synchronization signal resources) that the eNB may use for transmission of a synchronization signal, i.e. a plurality of synchronization signal detection resource candidates in which the UE may detect the synchronization signal, are predefined. The synchronization signal detection resource candidates may be configured according to any one of the embodiments of the present invention described with reference to FIGS. 6 to 9. For example, each of the synchronization signal detection resources may be defined at least by one or more frequency resources among plural predesignated frequency resources and/or one or more time resources among plural predesignated time resources. The plural predesignated time resources may respectively correspond to plural orthogonal frequency division multiplexing (OFDM) symbols. The plural OFDM symbols may be configured in every 'G' (≥1) OFDM symbols in the time domain. According to Proposal 1 of the present invention, the plurality of synchronization signal detection resource candidates may be predefined to correspond one-to-one to a plurality of cell ID groups into which a plurality of cell IDs is grouped or to the plurality of cell IDs. According to Proposal 2 of the present invention, one or more synchronization signal resource candidates among the plural synchronization signal detection resource candidates may be predefined to correspond one-to-one to one or more subframes in a frame including a plurality of subframes. According to Proposal 3 of the present invention, each synchronization signal resource candidate of the plural synchronization signal resource candidates may be predefined to correspond to one of a plurality of CP lengths. According to Proposal 4 of the present invention, each synchronization signal resource candidate among the plural synchronization signal resource candidates may be predefined to correspond to one of a plurality of eNB types.

The eNB processor may configure a synchronization signal detection resource to be used for transmission of a synchronization signal among a plurality of predefined synchronization signal detection resources, based on a cell ID of a cell/CC in which the synchronization signal is to be transmitted, time synchronization, a CP length, and/or an eNB type. The eNB processor may control the eNB RF unit to transmit the synchronization signal of a corresponding cell/CC on a synchronization signal detection resource corresponding to a cell ID of a cell/CC in which the synchronization signal is to be transmitted, time synchronization, a CP length, and/or an eNB type.

The UE processor may monitor a plurality of predefined synchronization signal detection resource candidates. That is, the UE processor may cause the UE RF unit to receive a radio signal on the plurality of synchronization signal detection resource candidates and may attempt to decode the radio signal received on each synchronization signal detection resource candidate. The UE processor may acquire a cell ID of a cell/CC in which the synchronization signal is transmitted, time synchronization, a CP length, and/or an eNB type, based on a synchronization signal detection resource on which the synchronization signal is effectively detected among the plurality of synchronization signal detection resource candidates, i.e. based on a synchronization signal detection resource carrying the synchronization signal. That is, the UE processor may determine a cell ID, time synchronization, a CP length, and/or an eNB type based on determination as to which resource actually carries the synchronization signal among a plurality of synchronization signal detection resource candidates.

According to the present invention, since transmission/reception of a synchronization signal suitable for a newly introduced frequency band in a next generation communication system is performed, system performance can be improved.

INDUSTRIAL APPLICABILITY

The embodiments of the present invention are applicable to an eNB, a UE, or other devices in a wireless communication system.

The invention claimed is:
1. A method for receiving a synchronization signal by a user equipment, the method comprising:
 detecting a synchronization signal of a cell on a frequency band; and
 acquiring a cell identity of the cell, or length information of a cyclic prefix (CP) applied to the cell, based on which synchronization signal time-frequency resource among the plurality of synchronization signal time-frequency resources the synchronization signal is detected, wherein each of the plurality of synchronization signal time-frequency resources is defined by a predefined frequency resource among a plurality of predefined frequency resources and by a predefined time resource among a plurality of predefined time resources, and wherein it is predefined that each of the plurality of synchronization signal time-frequency resources corresponds to one of a plurality of cell identities, or one of a plurality of cyclic prefix lengths.

2. The method according to claim 1, wherein the plurality of predefined frequency resources are orthogonal to each other, and wherein each of the plurality of predefined frequency resources is configured with consecutive subcarriers on a frequency axis.

3. The method according to claim 1, wherein the plurality of predefined time resources correspond respectively to a plurality of orthogonal frequency division multiplexing (OFDM) symbols, and wherein the plurality of OFDM symbols are configured in every 'G' (≥1) OFDM symbols in a time domain.

4. A user equipment for receiving a synchronization signal, the user equipment comprising:

a radio frequency (RF) unit and a processor configured to control the RF unit, wherein the processor is configured to:

detect a synchronization signal of a cell on a frequency band; and acquire a cell identity of the cell, or length information of a cyclic prefix (CP) applied to the cell, based on which synchronization signal time-frequency resource among the plurality of synchronization signal time-frequency resources the synchronization signal is detected, wherein each of the plurality of synchronization signal time-frequency resources is defined by a predefined frequency resource among a plurality of predefined frequency resources and by a predefined time resource among a plurality of predefined time resources, and wherein it is predefined that each of the plurality of synchronization signal time-frequency resources corresponds to one of a plurality of cell identities, or one of a plurality of cyclic prefix lengths.

5. The user equipment according to claim 4, wherein the plurality of predefined frequency resources are orthogonal to each other, and wherein each of the plurality of predefined frequency resources is configured with consecutive subcarriers on a frequency axis.

6. The user equipment according to claim 4, wherein the plurality of predefined time resources correspond respectively to a plurality of orthogonal frequency division multiplexing (OFDM) symbols, and wherein the plurality of OFDM symbols are configured in every 'G' (≥1) OFDM symbols in a time domain.

7. A method for transmitting a synchronization signal by a base station, the method comprising:

transmitting a synchronization signal of a cell on a synchronization signal time-frequency resource among a plurality of synchronization signal time-frequency resources on a frequency band of the cell, wherein each of the plurality of synchronization signal time-frequency resources is defined by a predefined frequency resource among a plurality of predesignated frequency resources and by a predefined time resource among a plurality of predefined time resources, and wherein it is predefined that each of the plurality of synchronization signal time-frequency resources is corresponding to one of a plurality of cell identities, or one of a plurality of cyclic prefix lengths.

8. The method according to claim 7, wherein the plurality of predefined frequency resources are orthogonal to each other, and wherein each of the plurality of predefined frequency resources is configured with consecutive subcarriers on a frequency axis.

9. The method according to claim 7, wherein the plurality of predefined time resources corresponds respectively to a plurality of orthogonal frequency division multiplexing (OFDM) symbols, and wherein the plurality of OFDM symbols are configured in every 'G' (≥1) OFDM symbols in a time domain.

10. A base station for transmitting a synchronization signal, the base station comprising:

a radio frequency (RF) unit and a processor configured to control the RF unit, wherein the processor is configured to transmit a synchronization signal of a cell on a synchronization signal time-frequency resource among a plurality of synchronization signal time-frequency resources on a frequency band of the cell, wherein each of the plurality of synchronization signal time-frequency resources is defined by a predefined frequency resource among a plurality of predesignated frequency resources and by a predefined time resource among a plurality of predefined time resources, and wherein it is predefined that each of the plurality of synchronization signal time-frequency resources is corresponding to one of a plurality of cell identities, or one of a plurality of cyclic prefix lengths.

11. The base station according to claim 10, wherein the plurality of predefined frequency resources are orthogonal to each other, and wherein each of the plurality of predefined frequency resources is configured with consecutive subcarriers on a frequency axis.

12. The base station according to claim 10, wherein the plurality of predefined time resources corresponds respectively to a plurality of orthogonal frequency division multiplexing (OFDM) symbols, and wherein the plurality of OFDM symbols are configured in every 'G' (≥1) OFDM symbols in a time domain.

* * * * *